United States Patent [19]

Shottenfeld et al.

[11] 3,729,635
[45] Apr. 24, 1973

[54] YARN INSPECTOR

[75] Inventors: Richard Shottenfeld, Jamaica; Solomon Abilock, Brooklyn, both of N.Y.

[73] Assignee: Lindly & Company, Inc., Mineola, N.Y.

[22] Filed: Oct. 14, 1970

[21] Appl. No.: 80,664

[52] U.S. Cl. ............................... 250/219 S, 26/51.5
[51] Int. Cl. .............................................. G01n 21/30
[58] Field of Search ................. 250/219 DF, 219 WE, 250/223 R, 223 B, 219 S; 209/111.7; 26/51.5

[56] References Cited

UNITED STATES PATENTS

| | | | |
|---|---|---|---|
| 3,020,033 | 2/1962 | McCreanor | 250/219 DF |
| 3,019,346 | 1/1962 | Laycak | 250/219 DF |
| 3,560,096 | 2/1971 | Watson | 250/219 DF |
| 3,427,109 | 2/1969 | Beattie | 250/219 DF |
| 3,389,789 | 6/1968 | Watson | 250/219 DF |
| 3,257,563 | 6/1966 | Laurent | 250/219 DF |

*Primary Examiner*—James W. Lawrence
*Assistant Examiner*—D. C. Nelms
*Attorney*—Robert E. Burns and Emmanuel J. Lobato

[57] ABSTRACT

A yarn inspector has three detecting circuits, one for detecting major defects, one for detecting minor defects and one for detecting the number of defects per unit length. The sensitivity of each of the defect detecting circuits can be set by means of digitally reading manually operable disc-type switches. A photosensor responsive to yarn defects is connected to all three detecting circuits. After amplification of the signal from the photosensor, a selected value representing the prevailing noise level is subtracted from the amplified signal. The remainder, representing a defect signal without noise, is further amplified to provide an output signal which is used to indicate and record the defect and, if desired, stop the warper or other machine with which the yarn inspector is used. Controls are provided on the front panel for setting the sensitivity of the detecting circuits and also for setting the number of defects, the unit length and the speed of the yarn being inspected. A single meter is provided with a selector switch to permit checking the inspection during operation and also testing and calibrating the inspector when the yarn is stopped.

17 Claims, 16 Drawing Figures

Patented April 24, 1973
3,729,635
14 Sheets-Sheet 2
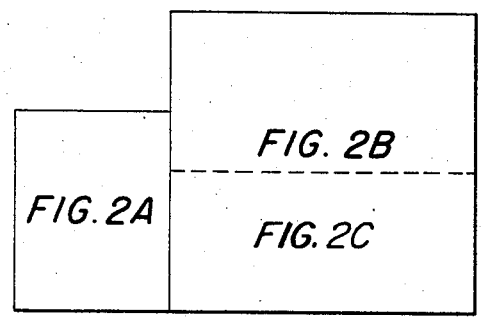
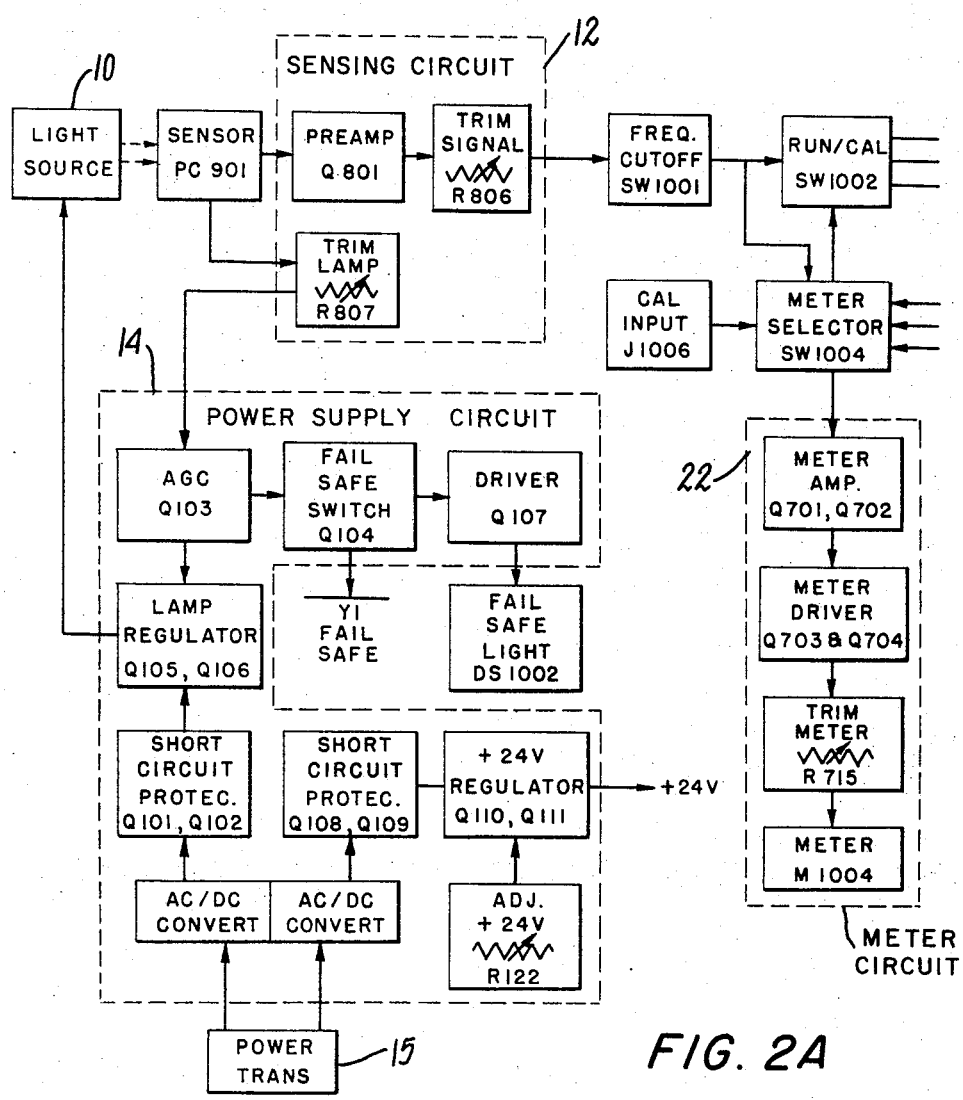
FIG. 2A

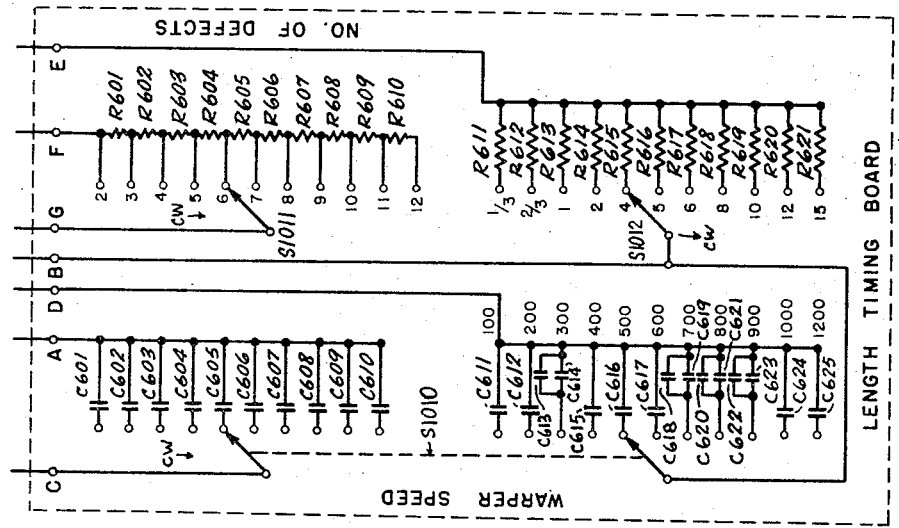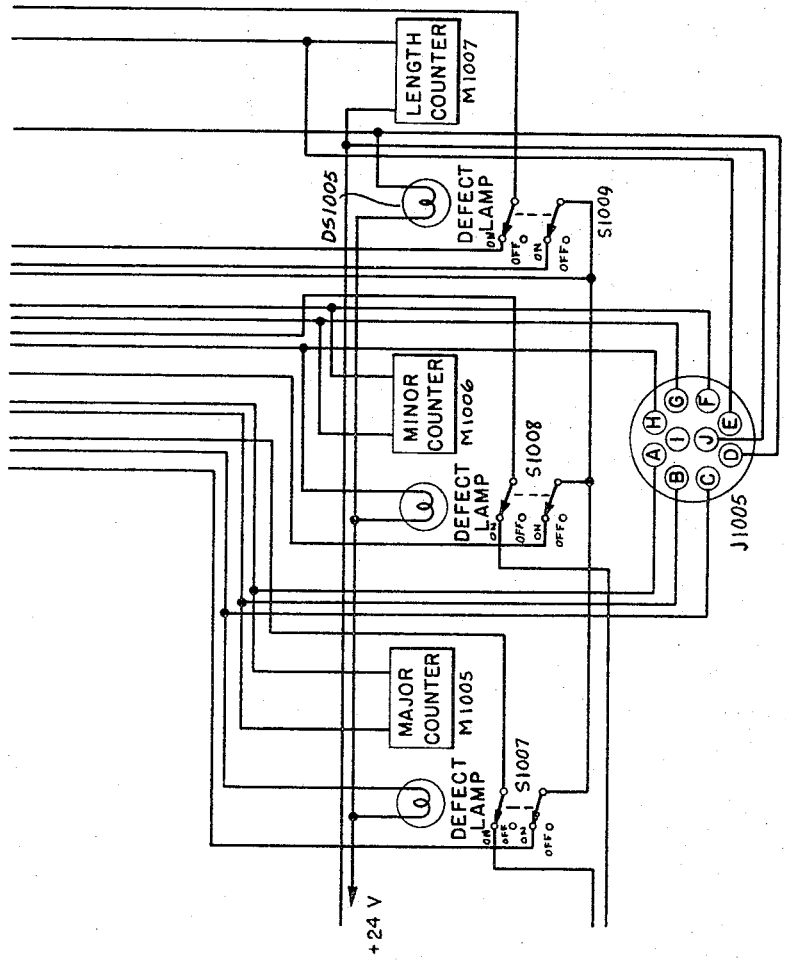
FIG. 3J

YARN INSPECTOR

The present invention relates to apparatus for photoelectrically inspecting yarn or other material while it is running from one position to another in connection with processing or handling procedures. While such apparatus is herein for convenience referred to as a yarn inspector it will be understood that it may be used to inspect material other than yarn. In the operation of textile equipment, for example a warper, it is desirable to inspect yarn being fed to the warper in order to detect defects in the yarn that might result in the malfunctioning of weaving or other equipment by which the yarn is subsequently used or produce defects in fabric produced from the yarn. In some instances it is sufficient merely to count the number of defects in order to determine the quality of the yarn. In other instances, it is desirable to stop the machine when a major defect occurs while merely counting minor defects.

In the inspection of yarn by photoelectric means there is always a problem of differentiating between electronic noise arising, for example, from normal irregularities or from vibration of the yarn and signals representing abnormal defects in the yarn. This gives rise to a problem of adjusting the sensitivity of the inspecting equipment. If the equipment is not sufficiently sensitive it may fail to detect defects in the yarn. If it is too sensitive it may cause false stops of the machine when there is no defect thereby causing inconvenience and loss of production.

It is an object of the present invention to provide an improved photoelectric yarn inspector suitable for use with textile machinery, for example a warper to provide continuous inspection of a sheet of yarns while it is running. Apparatus in accordance with the invention inspects for minor defects, major defects and for an excessive number of defects per unit length of the yarn. Any defects occurring in the yarn generate electrical signals which can be used as desired to indicate audibly or visually the presence of defects, count the defects that occur and stop the machine in event of selected magnitude or frequency of occurrence of defects in the yarn. For example, the apparatus may be set to stop the machine in the event of a major defect or an excessive number of defects per unit length while merely counting minor defects without stopping the machine.

Improved circuitry in accordance with the invention provides more positive differentiation between signals denoting defects in the yarn and background noise. This assures detection of all defects that the inspector is set to detect while avoiding false signals and false stops by reason of background noise. Differentiation of defect signals from noise is accomplished by preamplifying a signal received from a sensor element subtracting a predetermined amount from the preamplified signal and then amplifying the remainder. For example, if the preamplified signal has an amplitude of 1.03 v., the subtraction of 1 v. leaves the remainder of 0.03 v. which is then suitably amplified to produce an output signal.

The resulting increase in signal-to-noise ratio facilitates the detection of a signal having an amplitude barely greater than the peaks of the noise signal.

In order to facilitate setting the yarn inspector to respond only to defects of a selected magnitude, means is provided for easily and accurately setting the sensitivity of the apparatus for each category of defects to be inspected i.e., major defects, minor defects and defects per unit length. The sensitivity is manually set with a digital indication in terms of percentage of the change in the light flux falling on the photoelectric sensing element. Moreover, means is provided for checking the sensitivity setting by convenient testing and calibrating procedures.

A further advantage of the yarn inspector in accordance with the present invention is that it responds to both positive and negative signals. Some defects produce a pulse having a sharp rise and decline, others a sharp rise and slow decline and still others, for example a "torpedo", having a slow rise and a sharp decline. In accordance with the present invention means is provided for inverting the phase of the signal and also for transmitting the signal uninverted so that an output signal is produced regardless of the sign of the input signal.

In detecting the number of defects per unit length means is provided for counting two or more defects occurring in a small increment of length, for example 0.75 inches, as a single defect so as to provide a more realistic count.

A single meter provided with suitable calibration and switching means is usable for checking the overall quality of the yarn, the proper control of yarn tension to provide smooth running and the setting of sensitivity of the inspecting unit for each category of defects. The meter is also used in testing and calibrating procedures.

The characteristics and advantages of yarn inspecting apparatus in accordance with the present invention will appear more fully from the following description of a preferred embodiment shown by way of example in the accompanying drawings in which:

FIG. 2 is a diagram illustrating the arrangement of the block diagram of circuitry according to the invention;

FIGS. 2A, 2B and 2C are together a block diagram of circuitry of the yarn inspector;

FIGS. 3A to 3J are together a schematic circuit diagram of the yarn inspector.

Figure 1:
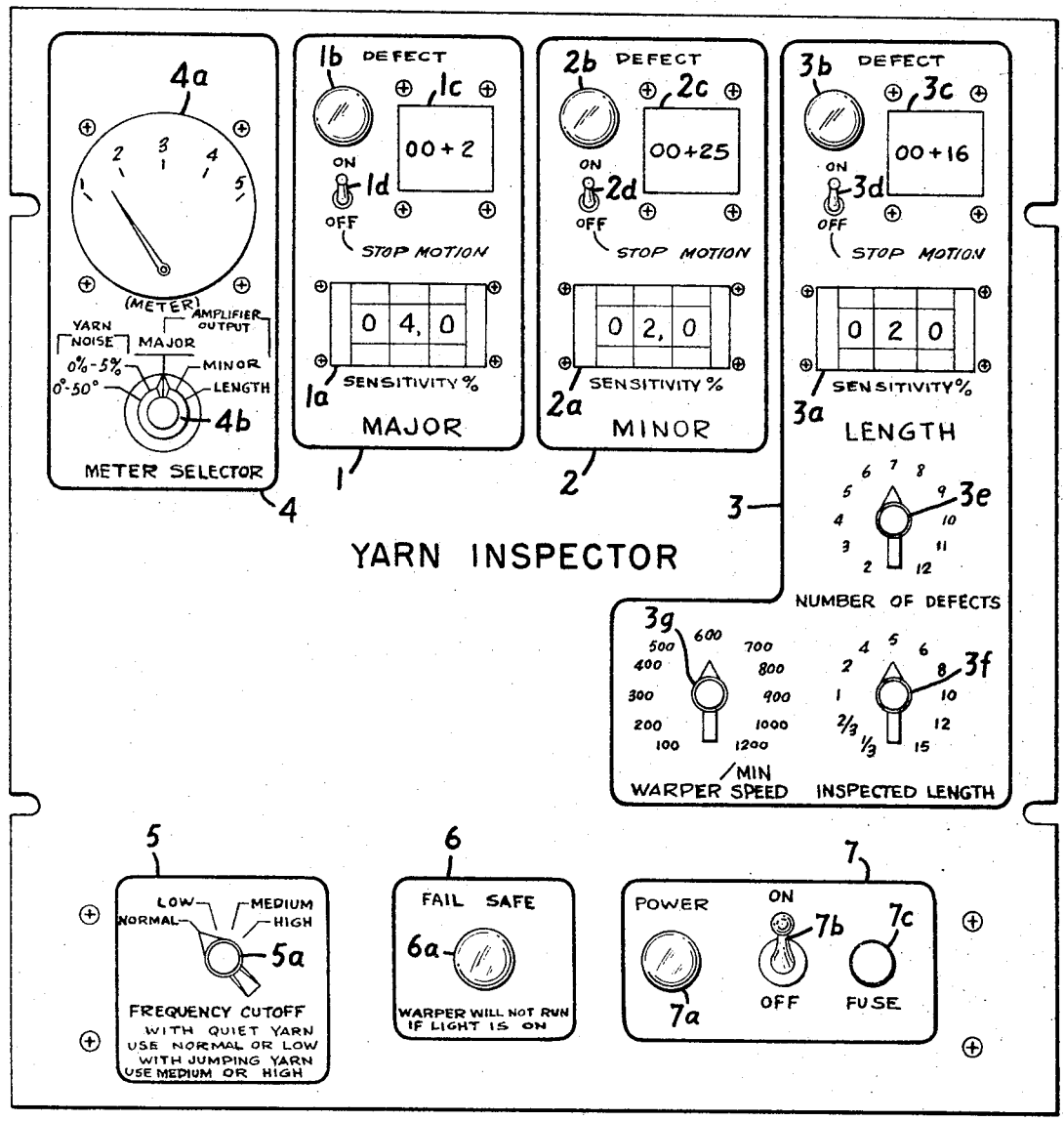
FIG. 1 is an elevation view of the front panel of a yarn inspector in accordance with the present invention.

The yarn inspector in accordance with the present invention shown by way of example in the drawings comprises a light source for directing a beam of light across a yarn sheet, a sensing circuit including a photoelectric transducer located at the opposite side of the yarn sheet and receiving light from the light source partially intercepted by said yarn sheet, a circuit for detecting major yarn defects, a circuit for detecting minor yarn defects, a circuit for detecting yarn defects per unit length, a coordinating logic circuit, a meter circuit including an indicating meter, and a power supply circuit which controls the light source and supplies power for the other circuits. The circuitry is housed in a cabinet having a front panel on which many of the controls and indicating devices are located.

The yarn inspector illustrated in the drawings is described as being used on a warper although it will be understood that it may be used with other equipment or machinery and that inspecting apparatus in accordance with the invention can be used for inspecting linear material other than yarn.

The front panel illustrated by way of example in FIG. 1 is shown as comprising a major defect panel 1, a minor defect panel 2, a defects per unit length panel 3, a meter panel 4, a frequency cutoff panel 5, a fail-safe indicator panel 6 and a power panel 7.

The major defect panel 1 is shown in FIG. 1 as comprising a control 1a for setting the sensitivity of the major defect detecting circuitry, a light 1b for indicating the occurrence of a major defect, a counter register 1c which indicates the number of major defects that occur and a switch 1d which controls the stop motion circuitry of the warper. When the switch 1d is in the "on" position, the warper is stopped upon the occurrence of a major defect and the light is illuminated continuously until the warper is restarted. With the switch in the "off" position, a major defect will be indicated by momentary illumination of the light 1b and will be counted by the counter 1c but will not stop the machine. The sensitivity control 1a comprises a manually operable digitally indicating switch for setting the sensitivity of the major defect detecting circuit in terms of percentage of the illuminated area of the photosensor which is obscured by the defect that is to be detected as a major defect. For example, if the sensitivity control is set for "4%", any defect occuring in the yarn that decreases the light falling on the photosensor by 4% or more will be indicated by illumination of the light 1b, will be counted by the counter 1c, and will result in stopping the warper if the switch 1d is in the "on" position. The sensitivity control switch 1a may for example comprise a plurality of discs which are arranged side by side and can be turned manually by engagement with a preferably knurled portion on the periphery of the discs. Each of the discs comprise a rotary switch, the position of which is indicated by numerals on the periphery of the disc. As shown in the drawings the switch comprises three discs of which the first indicates tens, the second units, and the third tenths in terms of percentage. As will be explained with reference to the circuit drawings, the switches control resistances in the input of the circuit for detecting major defects.

The minor defect panel 2 similarly comprises a sensitivity control 2a, and indicating light 2b, a counter register 2c and a stop motion control switch 2d. The several elements of the minor defect panel are the same as has been described with respect to the major defect panel. The sensitivity control for the minor defect panel is ordinarily set somewhat lower than that of the major defect panel. For example, the sensitivity control of the major defect panel may be set for 4 percent while that of the minor defect panel is set for 2 percent. In normal operation the stop motion switch 2d of the minor defect panel is set in off position while the stop motion switch 1d of the major defect panel is set in on position. Hence the warper will be stopped upon the occurrence of a major defect, while a minor defect will merely be counted and indicated by momentary illumination of the light 2b without stopping the warper.

The defects per unit length panel 3 is shown as comprising a sensitivity control 3a, an indicating light 3b, a counter register 3c and a stop motion switch 3d which are the same as have been described with reference to the major defect panel 1. It comprises three rotary switches 3e, 3f and 3g. The switch 3e sets the number of defects, the switch 3f sets the inspected length and the switch 3g is set according to the speed at which the yarn sheet is running. For example if the switch 3e is set at "7" and the switch 3f is set at "5" the light 3b will be illuminated and the counter will be advanced one unit whenever seven defects occur in a length of 5 yards. As will appear from the circuitry shown in the drawings, the "inspected length" is determined as a function of time and it is hence necessary to set the rotary switch 3g at the speed at which the warper is running (for example in yards per minute) in order for the "length" setting to be correct. In normal operation the sensitivity of the defects per unit length circuit is set lower than that of the major defect circuit and may be the same as that of the minor defect circuit. The stop motion switch 3d is usually in "on" position so that the warper will be stopped whenever a certain number of defects occur in a certain length as determined by the settings of the rotary switches 3e, 3f and 3g. However, to provide a realistic count, two or more defects occurring in a short increment of length, for example three-fourths inch, are counted as a single defect.

The meter panel 4 comprises a meter 4a and a selector switch 4b. The meter is calibrated in terms of percentage of the illuminated area of the photosensor that is obscured by a defect. In the first two positions of the selector switch 4b, the meter monitors the output of the photo-detecting head. In the first of these two positions, full scale deflection represents, for example a 50 percent defect while in second setting full scale deflection represents a 5 percent. Three other settings, connect the meter respectively with the major, minor and defects per length circuits so as to read the amplitude of the preamplified signal in the respective circuit as a check on the sensitivity setting of the circuit. The meter 4a can thus be used to monitor the operation of the yarn inspector while the warper is running. By means of a "run-test-calibrate" switch which is located on a side of the cabinet and will be referred to below, the meter can also be used in testing and calibrating the yarn inspector when the warper is stopped.

The frequency cutoff panel 5 comprises a rotary switch 5a which controls a filter circuit located between the sensing circuit and the several defect detecting circuits. The purpose of the filtering circuit is to reduce response to low frequencies which may be generated by "jumping" yarn. For example in "normal" position of the switch 5a, the signal is fed straight through without being filtered. In the "low", "medium" and "high" positions of the switch, progressively increasing filtering of the signal is effected to attenuate low frequencies. With a "quiet" yarn the switch 5a is set in "normal" or "low" position. With a "jumping" yarn the switch is set in "medium" or "high" position.

The fail-safe panel 6 comprises a light 6a which is controlled by the power supply circuit and is lighted when the yarn inspector is not in operative condition. When the light 6a is lighted, the warper will not run.

The power supply panel 7 comprises an indicating light 7a which is illuminated when the yarn inspector is turned on, an off-on switch 7b and a fuse 7c.

Circuitry of the yarn inspector is shown by way of example in FIGS. 2A to 3J. Principle components of the circuitry are shown schematically in the block diagram of FIGS. 2A and 2B while further details of the circuitry are shown in FIGS. 3A to 3J.

Figure 2B:
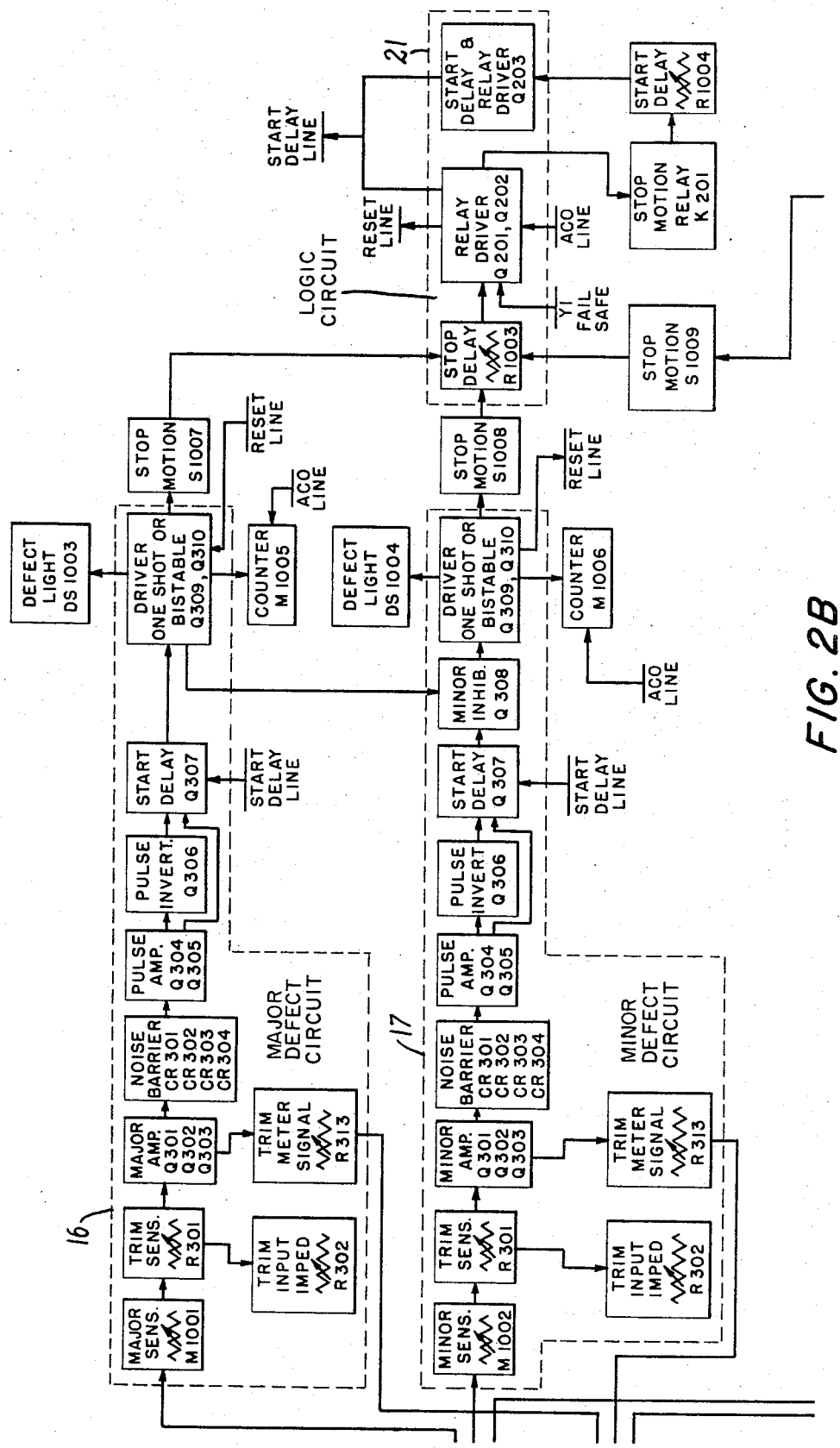
Figure 2C:
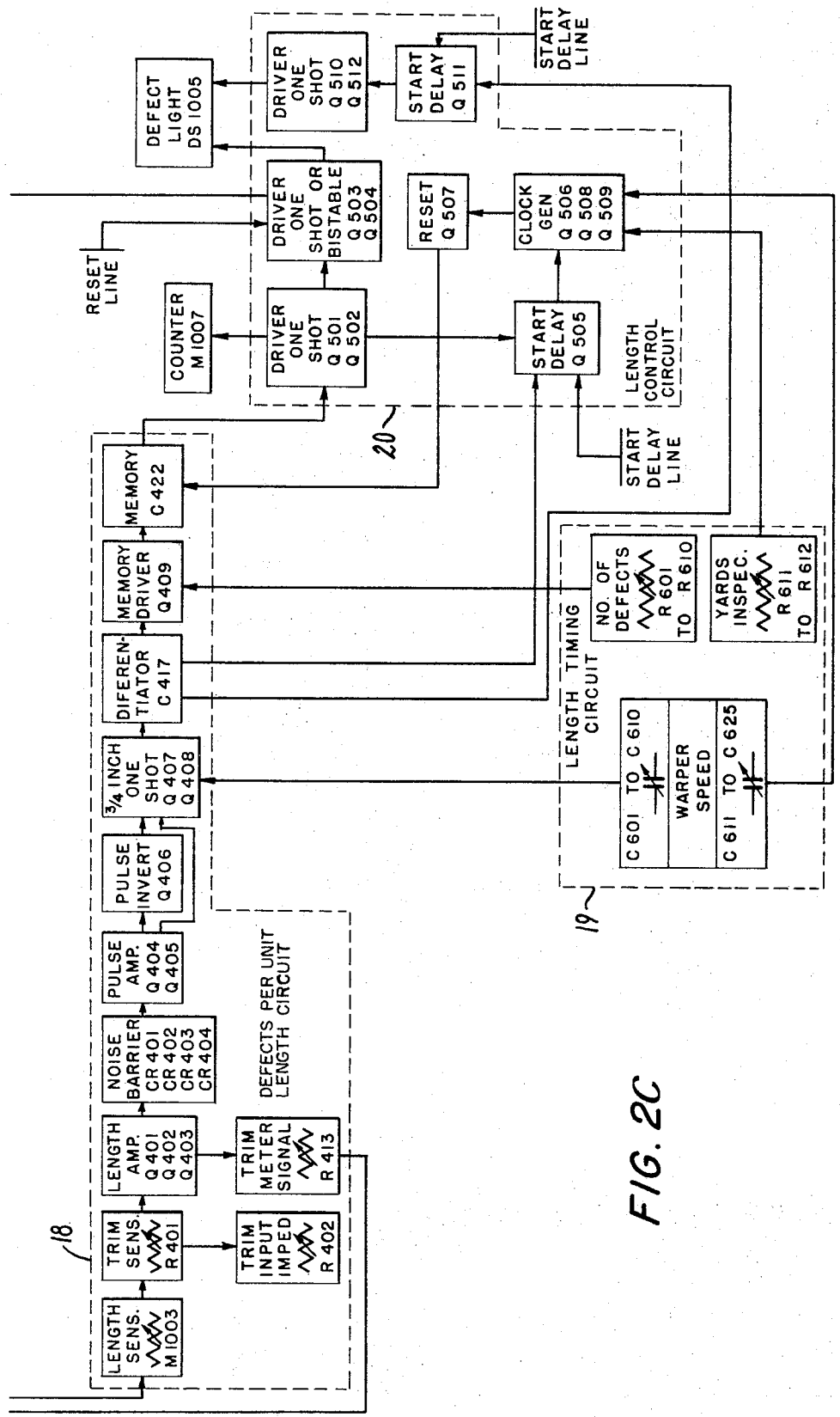
Figure 3:
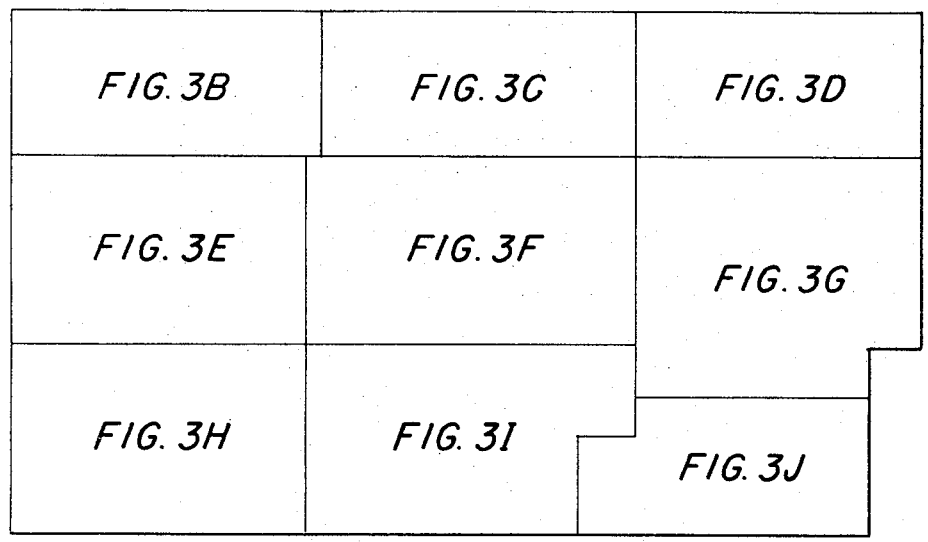
FIG. 3 is a diagram illustrating the overall layout of FIGS. 3A to 3J embodying details of the circuitry in FIGS. 2A and 2B.
Figure 3A:
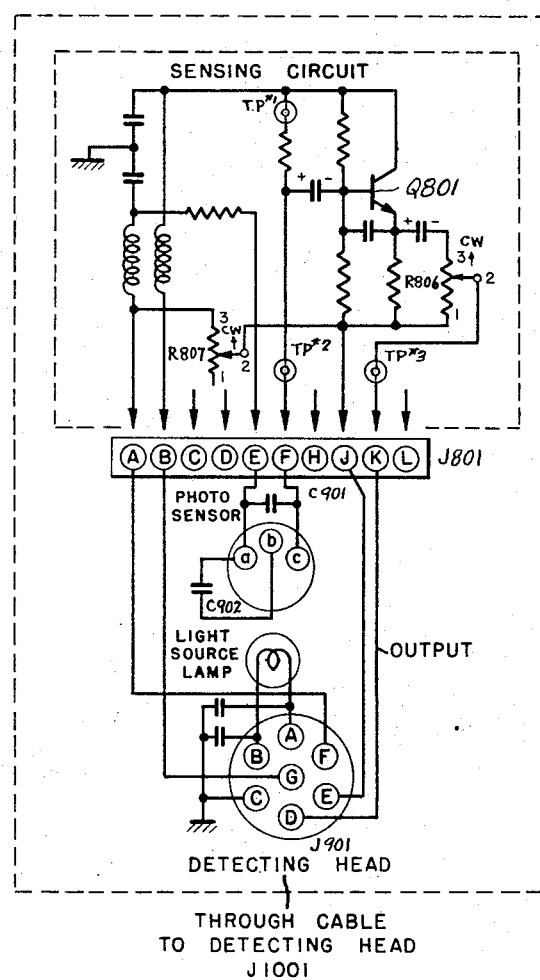

Referring first to FIGS. 2A and 3A, a light source 10 is provided at one side edge of the yarn sheet that is to be inspected. The yarn sheet is known manner comprises a multiplicity of yarns running over guides so as to lie in a common plane. The light source may for example comprise an incandescent lamp and a suitable optical system for directing a beam of light across the yarn sheet in the plane of the sheet. The lamp is supplied with power from and is controlled by a power supply circuit which will be described below.

At the opposite side edge of the yarn sheet there is provided a detecting head comprising a photosensor PC901 positioned in the plane of the yarn sheet so as to receive light from the light source 10 partially intercepted by the yarn sheet. The photosensor may, for example, be a silicon chip phototransistor having a light-sensitive area on which an image of the light source and the edgewise shadow of the yarn sheet is projected by a suitable optical system. The active area of the photosensor is preferably of the order of 0.0004 sq. in. In order to provide low, dark current leakage, the silicon chip is preferably small, for example having a transverse dimension of 0.03 inch. The image projected on the chip is still smaller being, for example, approximately square or rectangular with an area of the order to magnitude of 0.00002 to 0.00006 square inches. When a defect of any yarn of the sheet for example a fluff ball or a "torpedo" passes between the light source 10 and the photosensor PC901, the resulting change in the image of the illuminated yarn sheet projected on the photosensor produces a corresponding electric signal which may be either positive or negative depending on the direction of the change in the illumination of the active portion of the photosensor surface.

The resulting signal from the photosensor is amplified by a preamplifier Q801 in the sensing circuit 12 and is transmitted through a variable trim resistance R806 frequency cutoff switch SW1001 and run/calibrate switch SW1002 to the several defect detecting circuits as will be described below. The frequency cutoff switch SW1001 is a multiple position switch which is manually operable by the switch control 5a shown in FIG. 1 and described above with reference to the front panel. As seen in FIG. 3E the frequency cutoff switch controls a filter circuit comprising several capacitors. When the switch is in "normal" position the signal is transmitted straight through. In other positions of the switch the signal passes through the filter circuit, the capacitance of which is selected according to the setting of the switch. The run/calibrate switch will be referred to below in connection with the meter circuit. In the "run" position of the switch the preamplified signal from the photosensor is transmitted to all three defect detecting circuits.

A signal from the photosensor is also used to control the light source 10 so as to provide substantially constant normal illumination of the photosensor. Power for the light source 10 is supplied from a power supply circuit 14 to which AC power is supplied by a transformer 15. The alternating current power is converted to direct current by an AC/DC convertor and the resulting direct current is fed through the sensing resistor R104 of a short circuit protector Q101–102 to a lamp regulator Q105–106 which is controlled by an automatic gain control Q103 which receives a signal from the photosensor controlled by variable trim resistance R807 (see FIGS. 2A and 3H). If the normal or "datum" illumination of the photosensor changes the lamp regulator under control of the automatic gain control restores the normal value. If the power supply should be short circuited or overloaded, the voltage drop across the sensing resistor R104 will increase and trigger the complementary one shot circuit Q101, Q102 into operation. Normally both Q101 and Q102 are off. When triggered, they both go "on". Transistor Q102 when saturated, shorts the base of transistor Q105 to ground reducing to zero the output voltage of the power supply comprising transistors Q105 and Q106. Thus no dangerously high current flows under short circuit conditions. After a time determined by the RC constants of the circuit the complementary one shot circuit reverts to its original "on" state. During the transition the power supply output voltage gradually rises. If the short circuit still exists, the current through sensing resistor R104 will increase to the triggering point and the voltage will again drop to zero. If the short circuit is removed, the output voltage can rise to full value, while the current in the sensing resistor R104 remains below triggering level. Under these conditions the circuit resumes normal operation.

A signal from the automatic gain control Q103 is also supplied to a fail-safe switch comprising a transistor Q104 which supplies a fail-safe signal to the logic circuit that will be described below and also through a driver Q107 controls the lamp DS1002 of the fail-safe light 6a shown in FIG. 1.

The power supply circuit also includes means for supplying direct current to the other circuits. For example, an AC/DC convertor supplies direct current through the current sensing resistor R117 of a short circuit protector Q108–109 to a +24v. regulator Q110–111 provided with a trim resistor R122. The short circuit protection circuit operates similarly to the one described in the power supply for the light source.

Figure 3B:
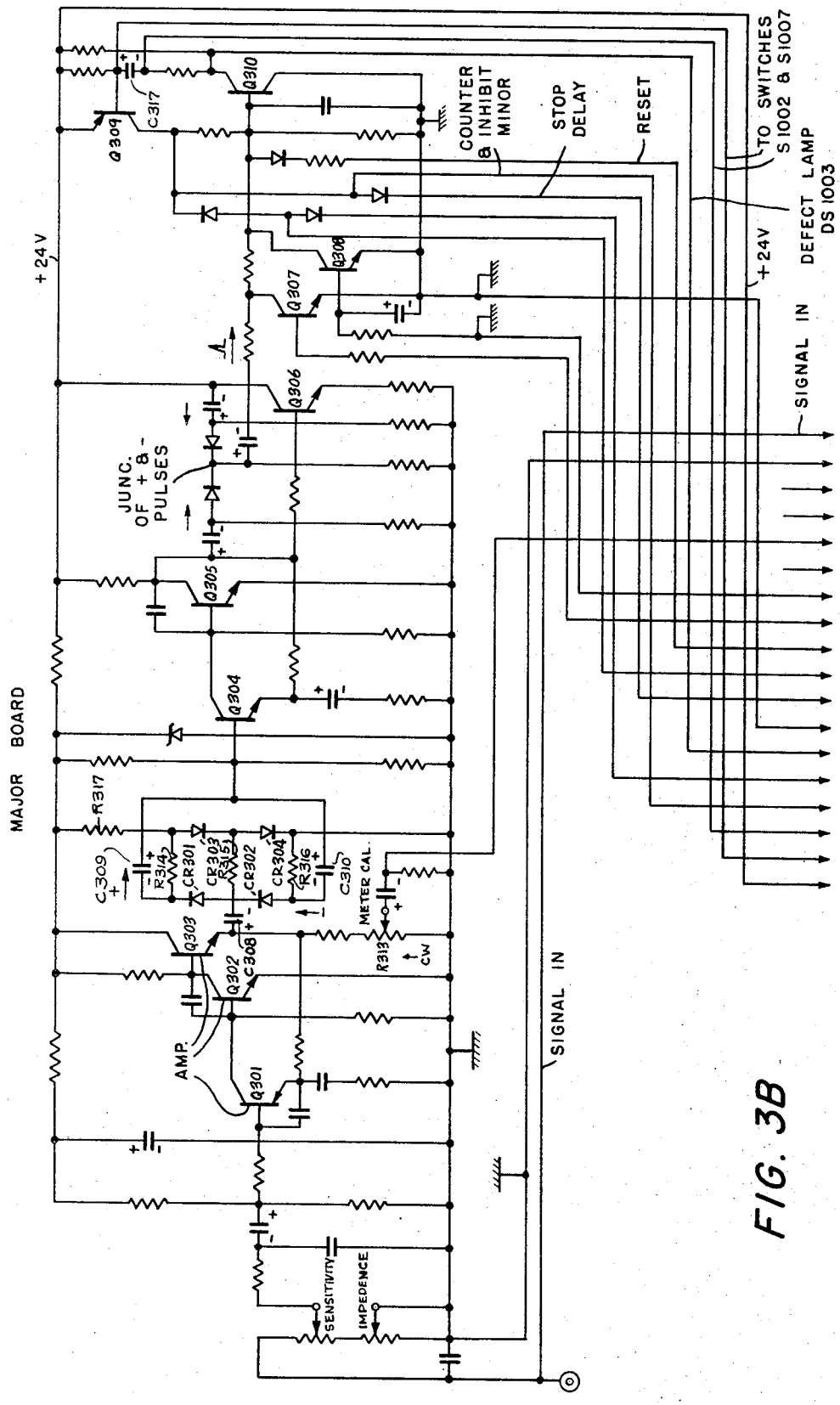
Figure 3C:
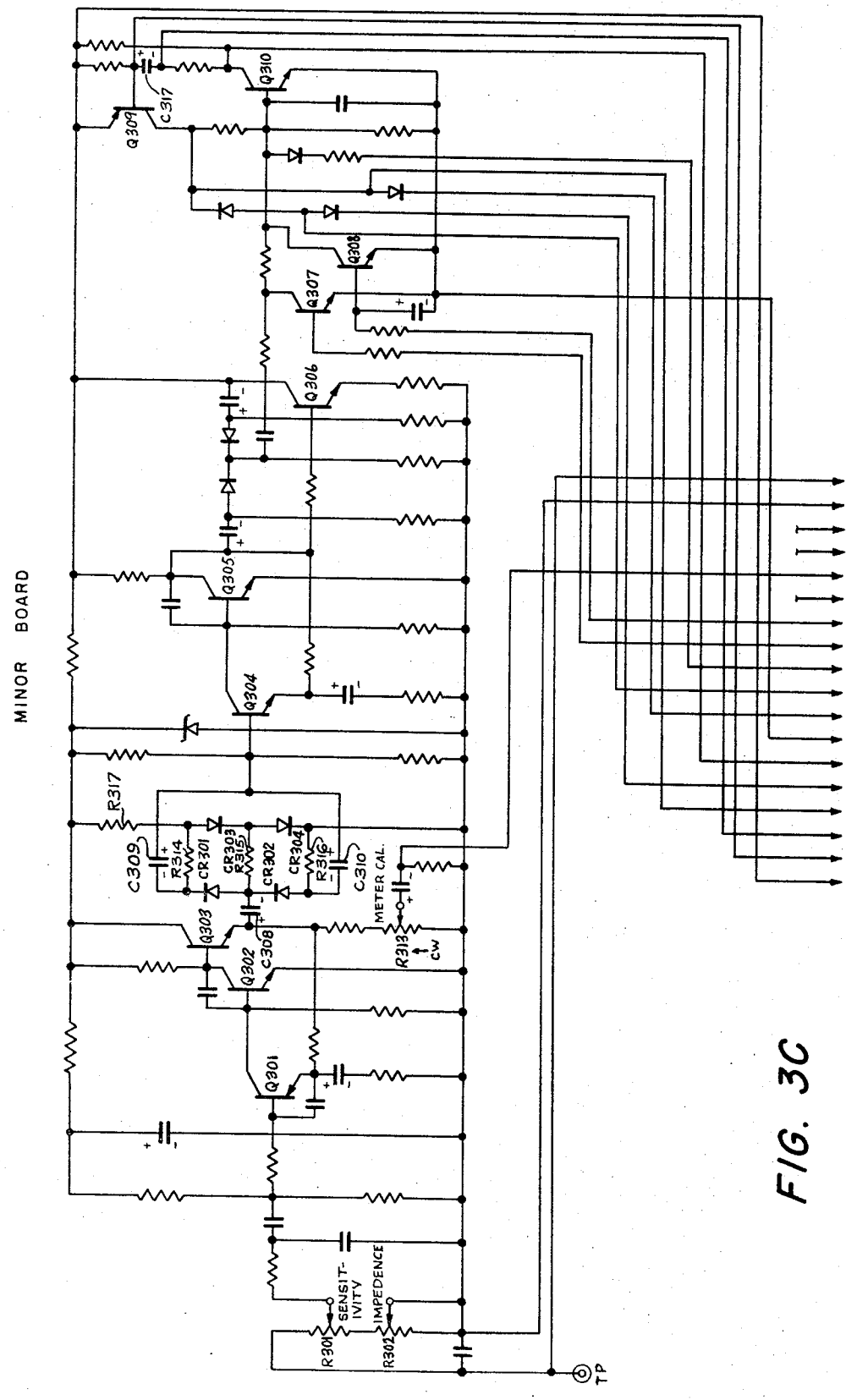
Figure 3D:
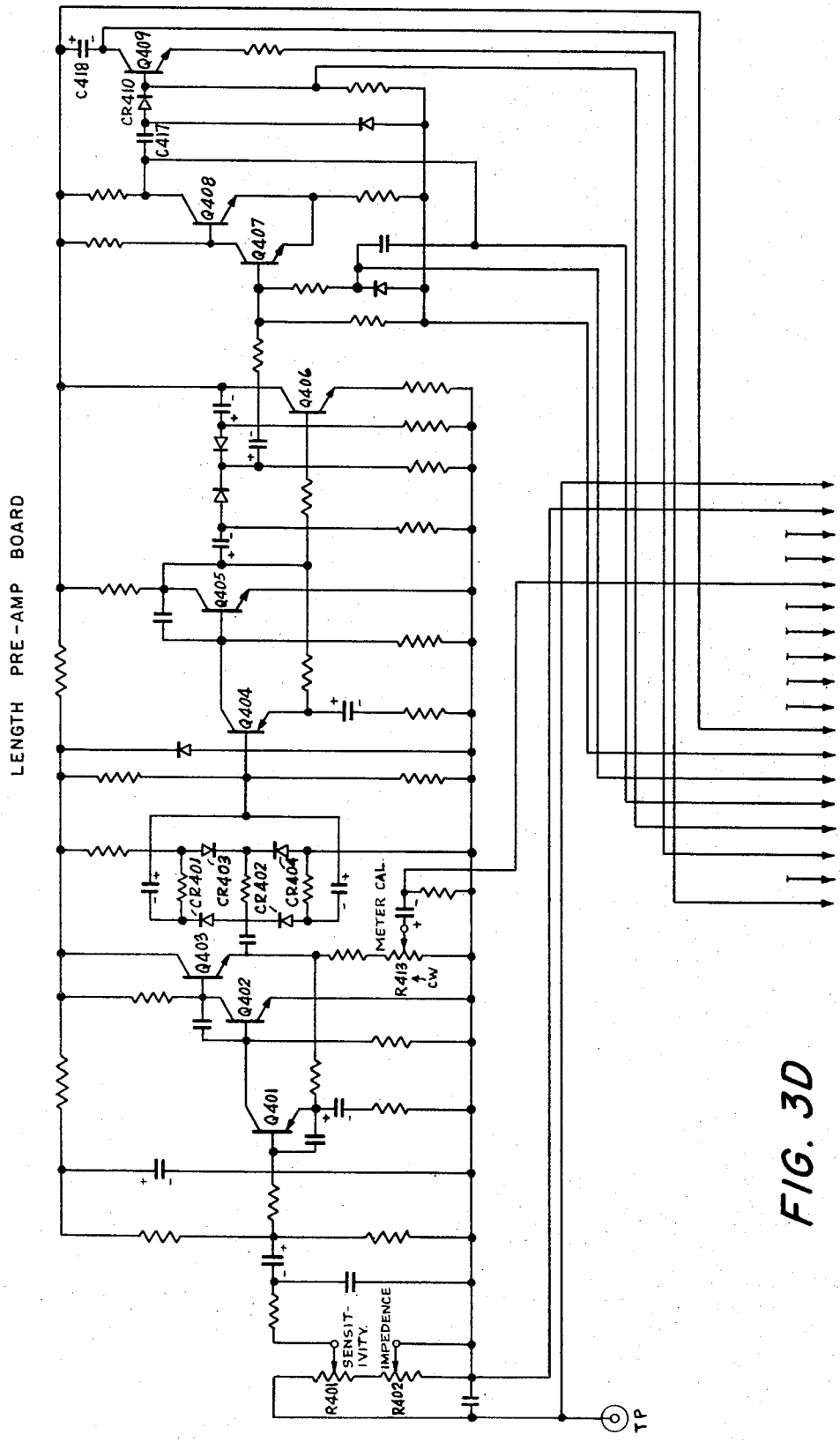
Figure 3E:
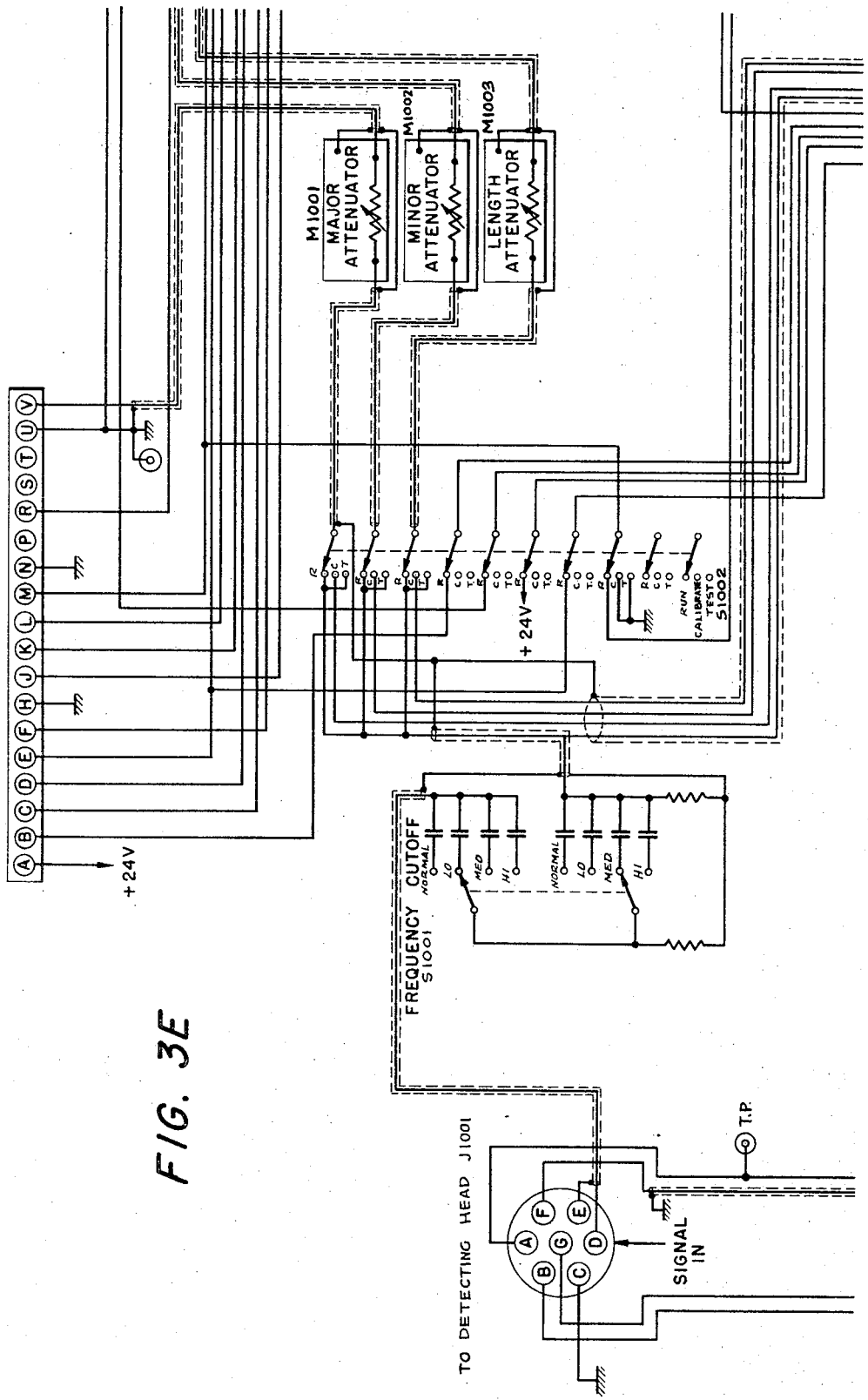
Figure 3F:
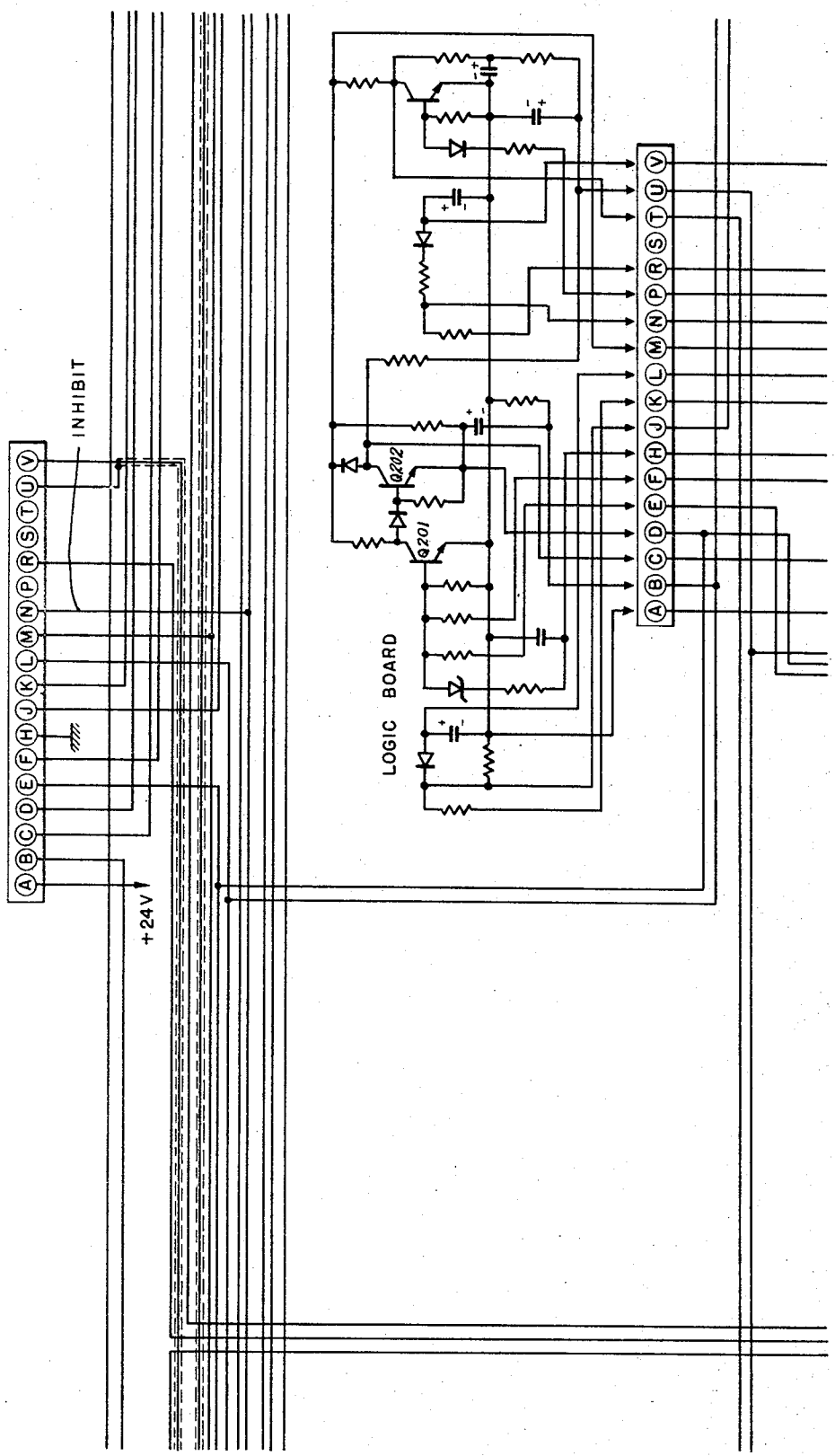
Figure 3G:
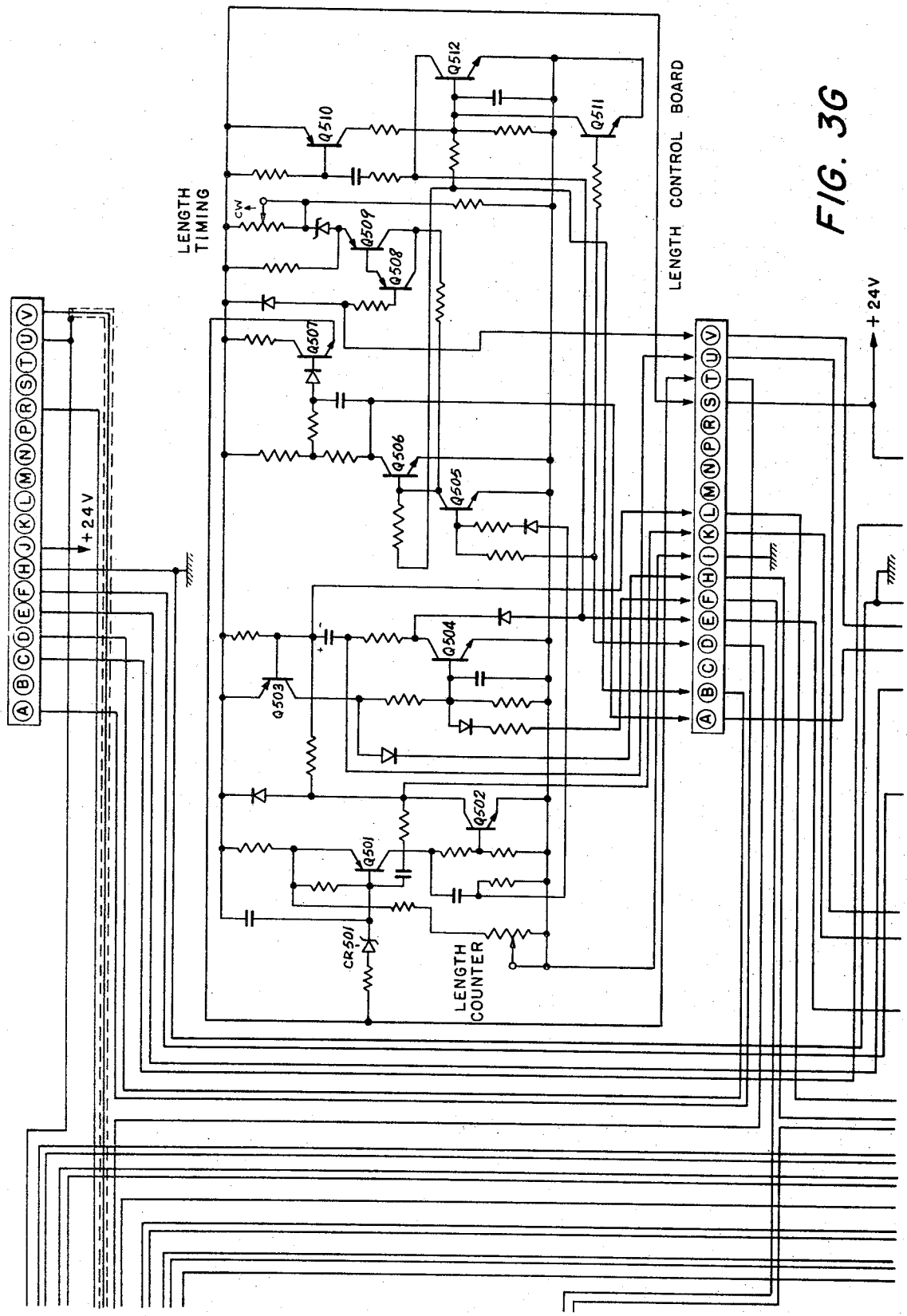
Figure 3H:
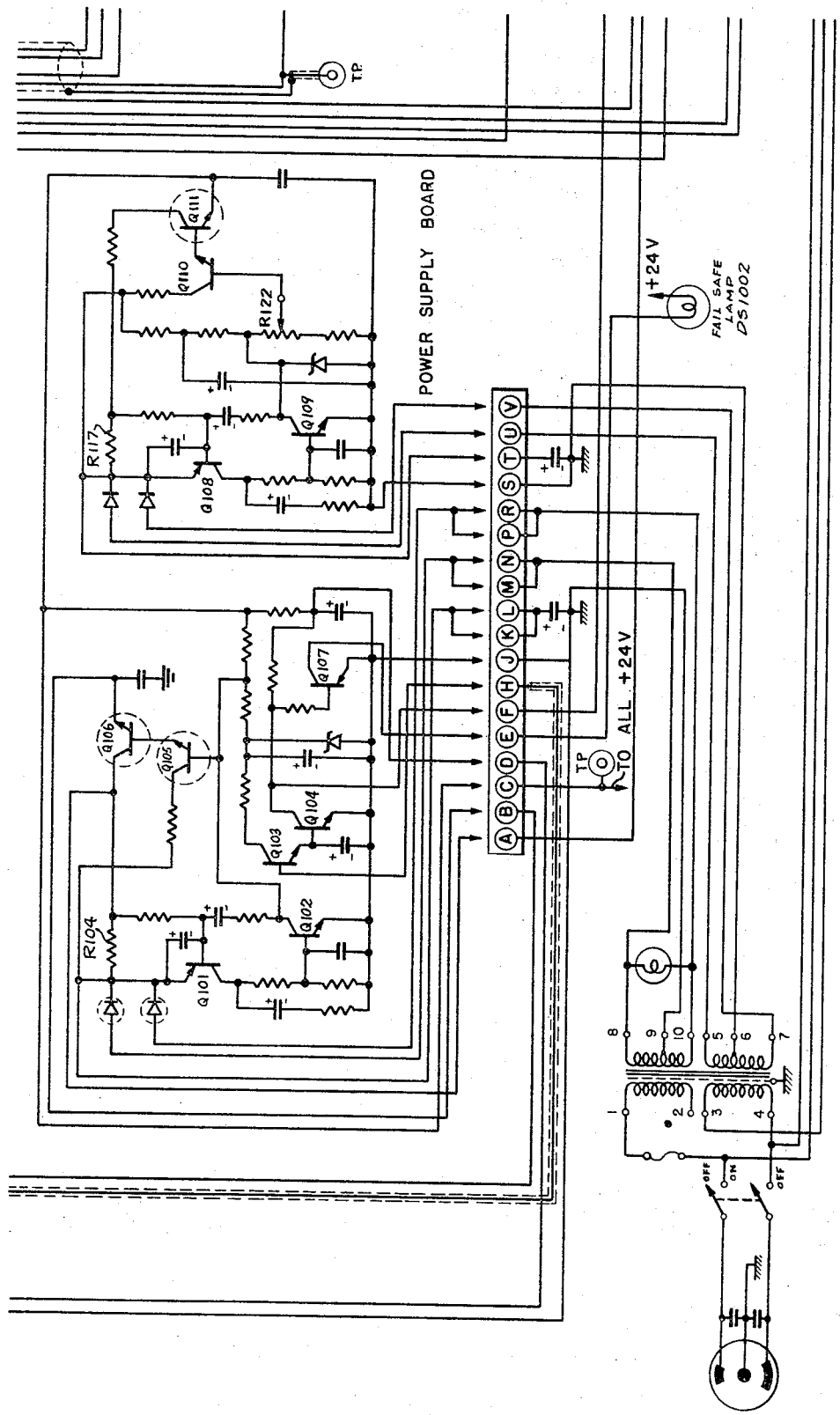
Figure 31:
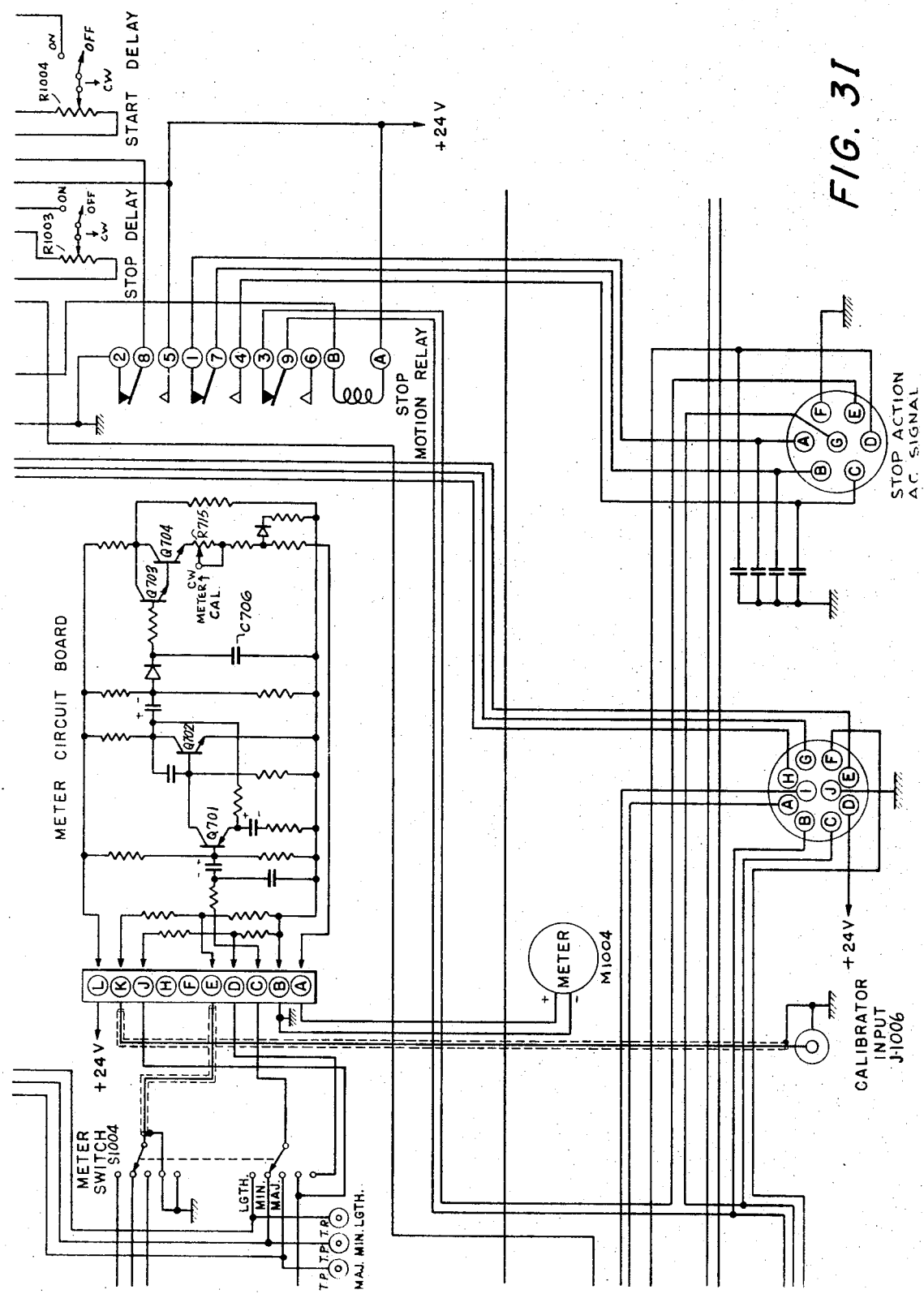

With reference to FIGS. 2B and 3B the major defect detecting circuit 16 is shown as comprising a sensitivity control shown schematically as a variable resistance M1001. The resistance in fact comprises a plurality of discrete resistors which can be connected in various combinations by means of the sensitivity control switch 1a shown in FIG. 1 to provide the desired value of resistance for attenuation of the input signal received from the sensing circuit. The input resistance is adjustable by means of a sensitivity trim resistance R301 and variable input impedance R302. The input signal thus suitably attenuated is amplified by an amplifier Q301–303 whereupon a selected value is subtracted from the amplified signal by means of a noise barrier CR301–304 shown in more detail in FIG. 3B. Resistance R317 and diodes CR303 and CR304 connected in series between ground and +24v form a voltage reference, since a current flowing through the diodes results in a voltage drop across each diode. Diodes CR301 and CR302 connected to diodes CR303 and CR304 by resistors R314, R315 and R316 are reverse biased by the voltage drop across diodes CR303 and CR304 respectively. A signal from the output of transistor Q303 applied through a capacitor C308 to the junction between diodes CR301 and CR302 has two possible signal paths to the input of transistor Q304. One path is through diode CR301 and capacitor C309. The other path is through diode CR302 and capacitor C310. Since diode CR301 is reverse biased and has a selected "turn-on" voltage, it passes only that portion of a positive signal that exceeds the sum of the reverse bias and the "turn-on" voltage. Similarly diode CR302 passes only that portion of a negative signal that exceeds the sum of its reverse bias and its "turn-on" voltage. For example, if the peak noise level of the amplified signal in the absence of any defect is 1v. and a typical defect signal level is 1.04v. a value of 1v. is subtracted leaving a remainder of 0.04v. which represents the defect signal pulse substantially free of noise. The signal pulse is then amplified by an amplifier Q304-305 having two outputs, one of which goes directly to a start delay circuit Q307 while the other goes to the start delay circuit through a pulse phase inverter Q306. Hence, regardless of whether the pulse as amplified by the amplifier Q304-305 is negative or positive, a positive pulse is supplied to the start delay circuit Q307. In order to inhibit operation of the detecting circuit when the warper is being started and before it has reached normal operating speed, a control voltage is applied to the start delay circuit through a start delay line from the logic circuit described below. From the start delay circuit, the defect signal pulse is transmitted to a driver Q309-310 which operates as a one-shot multivibrator if the run-test-calibrate switch is in "calibrate" or "test" position or if the stop motion switch is "off", and which operates as a bistable multivibrator if the run-test-calibrate switch is in "run" position and the stop motion switch is "on". The driver is shown as having four outputs of which one controls the lamp DS1003 of the major defect indicating light 1b shown in FIG. 1. Another provides a stop motion signal through a switch S1007 controlled by the switch lever 1d shown in FIG. 1. The third supplies a signal to the counter M1005, the register 1c of which appears in FIG. 1. An automatic cutoff line (ACO) from the warper is connected to open the circuit to the counter to prevent operation of the counter when the warper is not running. A reset line from the logic circuit is connected to the driver Q309-310. The fourth output inhibits the minor defect driver so that if the major defect driver is triggered, the minor defect driver cannot be actuated.

In the event a major defect passes between the light source 10 and the photosensor PC901, the resulting signal processed as described above and delivered to the driver Q309-310 causes illumination of the defect indicating light 1b continuously if the stop motion switch is "on" and momentarily if stop motion is "off" and if the stop motion switch is in "on" position the warper is stopped. Moreover, the defect is counted and accordingly displayed on the major defect counter register 1c.

The minor defect detecting circuit 17 (FIGS. 2B and 3C) is the same as has been described with respect to the major defect detecting circuit 16 except that an inhibitor Q308 is interposed between the start delay circuit Q307 and the driver Q309-310. The inhibitor is controlled by a line from the driver of the major defect detecting circuit 16 so that when a major defect occurs the minor defect detecting circuit is blocked so as to prevent the same defect from showing up both as a major defect and a minor defect. As indicated above the minor defect detecting circuit is ordinarily operated with the stop motion switch in "off" position so that minor defects are merely counted and indicated by the minor defect light without stopping the warper.

The defects per unit length detector circuit 18 (FIGS. 2C, 3D and 3G) is the same as has been described with reference to the major defect detecting circuit 16 up to the pulse inverter Q406. Following the pulse inverter there is a one-shot multivibrator Q407-408, the function of which is to incapacitate the circuit for a selected period of time after the detection of a defect so that two or more defects occurring in rapid succession for example in a distance of three-fourth inch of the yarn sheet count as a single defect. The time of recovery of the one-shot multivibrator Q407-408 is controlled by the length timing circuit 19 according to the setting of the warper speed by the control switch 3g shown in FIG. 1.

An output pulse of the one-shot multivibrator Q407-408 is differentiated by a circuit comprising a capacitor C417 to provide a sharp pulse of uniform amplitude and width. The differentiated pulse passes through a diode CR410 (FIG. 3D) to the base of a memory driver transistor Q409, the emitter current of which depends on the resistance in the emitter circuit as set by the "number of defects" switch 3F (FIG. 1) shown in FIG. 3J as switch S1011. The collector current charges a capacitor C418 which acts as a memory capacitor. The memory capacitor C418 is thereby charged step-by-step by successive pulses. The capacitor must be charged to a selected voltage for example 11v. in order to overcome the Zener diode CR501 and the bias on a transistor Q501 in the length control circuit 20 (see FIGS. 2B and 3G).

A pulse from the differentiator C417 also turns on a time interval generator Q506-509 of the length control circuit 20. Transistors Q506, Q508 and Q509 of the time interval generator are normally nonconductive. Transistor Q507, which is connected across the memory capacitor C418, is normally conductive and thus shorts the capacitor. A pulse applied to the base of transistor Q506 causes it to become conductive whereupon a capacitance comprising selected ones of capacitors C611 to C625 are charged at a rate depending on the value of a resistance comprising selected ones of resistors R611 to R621. The value of the capacitance is set by the setting of the warper speed knob 3g shown in FIG. 1 while the value of the resistance is determined by the setting of the inspected length by knob 3f. While the clock generator circuit is "on", transistors Q508 and Q509 provides sustaining current for transistor Q506. While transistor Q506 is conductive, transistor Q507 is nonconductive, permitting the memory capacitor C418 to be charged by pulses transmitted by transistor Q409. The voltage on the base of transistors Q508 and Q509 goes higher as the selected capacitor charges. When the voltage reaches a set value, transistors Q506, 508 and 509 are turned off and transistor Q507 is turned on, representing the end of the set time interval. If the number of defects for which knob 3e (FIG. 1) is set occur within a period of time represented by the inspected length as set by knob 3 f, the voltage of the memory capacitor C418 breaks down diode CR501 and turns on the one-shot multivibrator Q501-502 which thereupon applies a pulse to the counter M1007, the register 3c of which appears in FIG. 1 and applies a pulse to transistors Q506-509 to terminate the time interval. A pulse is also applied to a driver Q503-504 which operates either as a one-shot or bistable multivibrator depending on position of Stop Motion Switch 3d. This driver controls the lamp DS1005 of the defect indicating light 3b (FIG. 1) to provide continuous illumination of the lamp if the stop motion switch is set in "on" position and momentary illumination if the switch is in "off" position and also supplies a pulse to the stop motion circuit if the switch lever 3d is in "on" position.

Hence, if a selected number of defects of selected magnitude occur within a selected length of yarn, the counter register 3c is advanced one unit, the light 3b is turned on until reset and the warper is stopped if the switch lever 3d is in "on" position. As each defect occurs within a selected length, a one-shot multivibrator Q510-512 causes the defect indicating lamp to go on momentarily for each defect detected but it does not stay on. If fewer than the selected number of defects occur, the memory capacitor C418 is not charged to the level required to break down the diode CR501. Thus, if the timing time interval of the ramp generator Q506-509, which has been turned on by the first defect detected, finishes before the charge is completed, the transistor Q507 dissipates the charge on the memory capacitor C418 and the charging of the memory capacitor begins again with the first new defect detected.

The logic circuit 21 (FIG. 3F) comprises a relay driver Q201-202 to which signals from the several defect detecting circuits are fed (if the stop motion switches are in "on" position) through a stop delay circuit comprising a capacitor C201 and a resistance R1003. The purpose of the stop delay is to delay for a selected time the stopping of the warper so that a defect which has been detected will have moved to a position where it can be visually inspected. The relay driver Q201-202 is also controlled by the fail-safe line from the power supply circuit 14 and by the automatic cutoff line from the warper. An output of the relay driver Q201-202 controls the stop motion relay K201 which controls the operation of the warper, the operation of a defect signal lamp, and the operation of the variable start delay while a reset line connects the driver with the several defect detecting circuits.

The meter circuit 22 comprises a meter amplifier Q701-702, a capacitor C706, a meter driver Q703-704, a meter trim resistor R715 and a meter M1004 of which the meter dial 4a appears in FIG. 1. Through a meter selector switch SW1004 of which the control knob 4b appears in FIG. 1, the meter can be connected to the output of the sensing circuit 12 or to any of the defect detecting circuits 16, 17 or 18. The connection of the meter to a defect detecting circuit is at a point following the sensitivity control and the preamplification but before the noise barrier. The connection is made through a variable trim resistance R313 or R413. An input J1006 for a calibration signal is also connected with the meter selector switch.

Through selected settings of the run/calibrate/test switch SW1002 and the meter selector switch SW1004, the meter can be used to check on the yarn inspector during normal operation or when the warper is stopped. With the run/calibrate/test switch in "run" position and the meter selector switch in 0-50 percent position, the deflection of the meter pointer indicates the quality of the yarn and whether it is running quietly or is "jumping." Greater sensitivity is obtained by turning the meter selector knob to the 0-5 percent position in which full scale deflection of the meter hand indicates a 5 percent defect. When the indicating knob of the meter selector switch is turned to "major", "minor" or "length" position, the amplitude of the signal in the respective defect inspecting circuit can be observed. The deflection of the meter pointer indicates the magnitude of the signal peaks in relation to the triggering level. The circuitry of the meter provides for a rapid attack and slow decay so that the meter hand responds quickly to a pulse representing a defect and falls back slowly so that an operator has time to observe the magnitude of the defect. The meter reading provides a check on the sensitivity settings of the respective defect inspecting circuits.

With the run/calibrate/test switch S1002 in "test" position everything works the same except that the warper cannot run and the counters are locked out. In this condition of the equipment, a defect can be simulated by passing a test wire between the light source and the photoelectric sensor. The test wires are calibrated to represent a defect of given magnitude. For example, if a 3 percent wire is used and the meter selector switch is set at 0-5 percent position, the meter hand should deflect to 3 when the wire is passed between the light source and the sensor. The meter selector switch can then be turned to the different defect inspection circuit positions in order to check the sensitivity settings. For example, if the major defect circuit is set for 4 percent and the minor defect circuit is set for 2 percent, a 3 percent test wire should cause the triggering of the minor defect circuit but not of the major defect circuit. By using different test wires and different meter selector switch settings, the meter itself and the sensitivity settings can be quickly and conveniently checked.

With the run/calibrate/test switch in "calibrate" position, the procedure is the same except that instead of using a test wire a calibrating signal of known magnitude is fed into the yarn inspector through the calibrator input jack J1006.

There is thus provided in accordance with the present invention a yarn inspector which is accurate, reliable and consistent in its operation. The sensitivity of the yarn inspector can be quickly, conveniently and accurately set according to the particular requirements of the material being inspected and the warper or other equipment with which the inspector is used. While the drawings illustrate by way of example particular circuitry suitable for carrying out the invention, it will be understood that the invention is in no way limited to the specific circuitry shown.

What we claim and desire to secure by Letters Patent is:

1. Yarn inspecting means for inspecting a sheet of yarn comprising a multiplicity of yarns running side-by-side in a common plane for minor yarn defects, major yarn defects and yarn defects per unit length of said yarn sheet, comprising illuminating means at one side edge of said sheet for directing a light beam across said sheet in a direction perpendicular to the direction of travel of the yarn and in the plane of said sheet, receiving means at the opposite side of said sheet including photoelectric transducing means and optical means for receiving the light of said light beam and projecting an umbral edgewise image of said yarn sheet on said transducing means to produce an electrical input signal responsive to changes in the size of said image, and thereby responsive to yarn defects comprising portions projecting upwardly or downwardly from the plane of said yarn sheet, said signal comprising oscillations in a central band representing background noise resulting from normal characteristics of the yarn, positive peaks extending up from said central band and representing yarn defects and negative peaks extending down from said central band and representing yarn defects, means for preamplifying said signal; minor defect detecting means receiving signals from said preamplifying means and comprising means for selectively setting the sensitivity of said minor defect detecting means to determine the magnitude of minor defects detected, noise barrier means for blocking out the portion of said signal in said central band while leaving said positive peaks and negative peaks representing yarn defects, means for amplifying the remaining unblocked peak signals, representing defects means for counting minor defects exceeding a predetermined magnitude; major defect detecting means receiving signals from said preamplifying means and comprising means for selectively setting the sensitivity of said major defect detecting means to determine the magnitude of major defects detected, noise barrier means for blocking out the portion of said signal in said central band while leaving said positive peaks and negative peaks representing yarn defects, means for amplifying the remaining unblocked peak signals, representing defects, means for counting defects exceeding a predetermined magnitude, means for detecting the number of defects per unit length of said sheet receiving signals from said preamplifying means and comprising means for selectively setting the sensitivity of said defects per unit length detecting means to determine the magnitude of defects detected, noise barrier means for blocking out the portion of said signal in said central band while leaving said positive peaks and negative peaks representing yarn defects, means for amplifying the remaining unblocked peak signals, representing defects means for selecting a unit of length in which defects are to be detected, means for selecting the number of defects of said selected magnitude permitted in said selected unit of length, means for producing a signal herein designated a DPL signal when the number of defects of said selected magnitude occurring in said selected unit of length exceeds said selected number, and means for counting said DPL signals; output means selectively receiving signals from said minor defect detecting means, said major defect detecting means and said defects per unit length detecting means and supplying an output signal for effecting indicating and machine control functions.

2. Yarn inspecting means according to claim 1, in which said sensitivity setting means comprises manually operable digital setting means.

3. Yarn inspecting means according to claim 2, in which said sensitivity setting means comprises a signal transmitting circuit, a plurality of discrete resistors and switching means operably by said manually operable setting means for connecting different combinations of said resistors in said circuit to vary the impedance of said circuit by discrete steps.

4. Yarn inspecting means according to claim 1, in which each said defect detecting means comprises means for inverting the phase of said input signal and also means for transmitting said signal uninverted, whereby said defect detecting means is responsive in like manner to both positive and negative signals.

5. Yarn inspecting means according to claim 1, in which said means for selecting a unit of length in which defects are to be detected comprises timing means and means for setting the time of said timing means according to the speed of movement of said yarn sheet.

6. Yarn inspecting means according to claim 1, in which said means for detecting the number of defects per unit length of said sheet comprises means for counting as a single defect a plurality of defects occurring in a selected increment of length.

7. Yarn inspecting means according to claim 1, comprising a meter and means for selectively connecting said meter to read the amplitude of the signal in said means for detecting major defects, means for detecting minor defects and means for detecting defects per unit length respectively following said sensitivity setting means.

8. Yarn inspecting means according to claim 7, comprising means for selectively connecting said meter to read the amplitude of all signals from said photoelectric transducing means and thereby providing an indication of the quality of the yarn being inspected.

9. Yarn inspecting means according to claim 8, comprising means for selectively setting said meter to indicate (1) the quality of the yarn being inspected and (2) the background noise level of the signals from said photoelectric transducing means and thereby incorrect tensioning of the yarn being inspected giving rise to yarn vibration and hence background noise exceeding a selected level.

10. Yarn inspecting means according to claim 9, comprising means for selectively feeding to said defect detecting means a known calibrating signal to check the operation of said defect detecting means and said sensitivity setting means.

11. Yarn inspecting means according to claim 10, comprising function control circuit means including switch means having three positions namely (1) a normal running position in which said yarn sheet is driven, (2) a testing position in which said yarn sheet is stopped and testing is effected by passing a test piece of selected size between said illuminating means and said receiving means and (3) a calibrating position in which said known calibrating signal is fed into said defect detecting means.

12. Yarn inspecting means according to claim 7, in which said meter has the characteristic of a fast attack to reach quickly the value to be indicated and slow decay to retain for a short time the indicated value.

13. Yarn inspecting means according to claim 1, in which said means for producing a DPL signal when the number of defects of said selected magnitude occur in a selected unit length comprises a memory capacitor, means for incrementally charging said memory capacitor upon the occurrence of said defects and means for producing a DPL signal when a predetermined charge is reached.

14. Yarn inspecting means according to claim 13, comprising means for discharging said memory capacitor after a selected period if said predetermined charge is not yet reached.

15. Yarn inspecting means according to claim 1, further comprising means for inhibiting the counting of a defect by said minor defect counting means when a major defect occurs.

16. Yarn inspecting means according to claim 1, comprising signal means for indicating defects per unit length, said signal means comprising lamp means and means for lighting said lamp means momentarily each time a defect of selected magnitude is detected and for lighting said lamp means continuously when the number of defects occurring in said selected unit of length exceeds said selected number.

17. Yarn inspecting means according to claim 1, including power supply circuit means comprising a power transistor controlling output power, a one-shot multivibrator comprising second and third transistors both normally non-conducting and an RC circuit, a sensing resistor in the output circuit of said power transistor, means connecting the base and emitter of said second transistor across said sensing resistor whereby a voltage drop across said sensing resistor exceeding a selected value turns said second transistor and hence said third transistor "on", and means connecting the base of said power transistor through said third transistor to ground, whereby said power transistor is rendered non-conducting when said third transistor is conducting, said RC circuit providing a time delay for return of said one-shot multivibrator to normal non-conducting condition of said second and third transistors if the voltage drop across said sensing resistor has been reduced to below said selected value.

* * * * *